US006013354A

United States Patent [19]

Tomizawa et al.

[11] Patent Number: 6,013,354

[45] Date of Patent: Jan. 11, 2000

[54] INK-JET RECORDING FILM

[75] Inventors: Tadashi Tomizawa; Naoki Sakazume, both of Koshigaya, Japan

[73] Assignee: Somar Corporation, Japan

[21] Appl. No.: 09/107,323

[22] Filed: Jun. 30, 1998

[30] Foreign Application Priority Data

Jul. 31, 1997 [JP] Japan .................................... 9-206508

[51] Int. Cl.$^7$ ........................................................ B32B 3/00

[52] U.S. Cl. .......................... 428/206; 428/195; 428/199; 428/211; 428/327

[58] Field of Search .................................... 428/195, 199, 428/206, 211, 327

[56] References Cited

FOREIGN PATENT DOCUMENTS

| | | |
|---|---|---|
| 6-427 | 1/1994 | Japan . |
| 7-40646 | 2/1995 | Japan . |
| 7-96655 | 4/1995 | Japan . |
| 7-186521 | 7/1995 | Japan . |
| 8-156396 | 6/1996 | Japan . |
| 9-123593 | 5/1997 | Japan . |

*Primary Examiner*—William Krynski
*Assistant Examiner*—Chris Cronin
*Attorney, Agent, or Firm*—Wenderoth, Lind & Ponack, L.L.P.

[57] ABSTRACT

Provided by the invention is a recording film suitable for recording by using an ink-jet printer capable of giving very sharp printed images and having advantages of rapid drying of the water-base printing ink thereon and little re-transfer of the printed images directly after printing onto the surface coming into contact with the printed surface of the recording film. The recording film is a layered sheet material comprising (A) a base film of a plastic resin; (B) an ink-receptive layer formed from a mixture of a polyvinyl alcohol and a polyvinyl pyrrolidone; and (C) an overcoating layer on the ink-receptive layer. The overcoating layer is formed from a mixture of a water-insoluble polyvinyl acetal resin, fine particles of an acrylic resin and a polyvinyl pyrrolidone.

11 Claims, No Drawings

INK-JET RECORDING FILM

BACKGROUND OF THE INVENTION

The present invention relates to a novel ink-jet recording film or, more particularly, to a recording film suitable for recording of information by using an ink-jet printer and capable of rapidly fixing or drying the inked pattern so as to be freed from troubles of re-transfer and smearing or blur even if the inked pattern is rubbed with a finger tip or the inked pattern is overwritten by second ink-jet printing immediately after the first printing.

Along with the rapid progress in the computer technology, it is widely practiced in recent years that computer-processed information of various natures of data and images is processed very conveniently and rapidly into presentation forms such as handout copies and posters by printing out using a suitable printer machine. Various types of printer machines are known and respectively employed in this application including dot-impact printers, laser printers, thermal printers and ink-jet printers, of which ink-jet printers or ink-jet plotters are most widely employed by virtue of the advantages that the machine noise in printing is low, these machines are adaptable to full-color printing and the cost for running the machine is relatively low as compared with other types of printing machines.

Needless to say, the output of an ink-jet printer or plotter is printed on a recording film which basically can be a sheet of plain paper or coated paper. With an object to improve the quality of ink-jet recorded pattern, specific recording films are also used for ink-jet printing as prepared by providing the surface of a base film of a plastic resin with an ink-receptive layer. Such a recording film is sometimes used in the preparation of posters with a colored image because the ink-jet printed material thereon has excellent glossiness.

Several types of ink-receptive layers are proposed in the prior art including a monolayer formed of a blend of two hydrophilic polymers including, one, a polyvinyl alcohol, referred to as PVA hereinafter, and, the other, a polyvinyl pyrrolidone, referred to as PVP hereinafter, disclosed in Japanese Patent Publication 6-427 and a dual layer consisting of an underlayer of a PVP and an overlayer of a PVA as disclosed in Japanese Patent Kokai 7-40646. Since the ink-receptive layer in these recording films is formed from hydrophilic or water-soluble resins, it is unavoidable that, when printing is made on the recording film with a water-base printing ink, the ink-receptive layer absorbs the ink to cause swelling or partial dissolution of the ink-receptive layer so that a length of time is taken before drying of the printing ink absorbed in the ink-receptive layer to accomplish fixing of the printed pattern.

With an object to overcome the above mentioned disadvantages, various attempts and proposals are made in the prior art. For example, Japanese Patent Kokai 7-186521 proposes that an overcoating layer consisting of a blend of a hydrophilic resin and inorganic fine particles of 10 to 300 nm particle diameter is formed on an ink-receptive layer of a hydrophilic resin. Japanese Patent Kokai 7-96655 proposes that an ink-permeable overcoating layer of a hydrophilic resin is formed on an ink-receptive layer containing fine particles of a hydrophobic resin having a particle diameter not exceeding 0.3 μm dispersed in the matrix of a water-absorbing polymer. Further, Japanese Patent Kokai 9-123593 teaches that the ink-receptive layer is formed from a porous underlayer of hydrated alumina and an overcoating layer of a water-soluble resin.

A problem in the above mentioned first and third proposals is that, due to the difficulty in obtaining uniform dispersion of fine particles of an inorganic material or an organic resin in the matrix layer of a hydrophilic or water-soluble resin, the coating workability with the coating composition cannot be high enough consequently with low productivity of the manufacturing process of recording films. The recording film according to the second proposal also has a defect of blocking of the recording films after printing due to the extremely small surface roughness of the ink-permeating layer.

SUMMARY OF THE INVENTION

The present invention accordingly has an object, by overcoming the problems and disadvantages of the prior art recording films for ink-jet printing, to provide a novel and improved recording film for ink-jet printing capable of exhibiting excellent dryability of the water-base printing ink thereon not to cause re-transfer of the ink-printed pattern or smear of the printed pattern by finger touch and having excellent see-through transparency and glossiness of the surface.

Thus, the recording film for ink-jet printing provided by the present invention is an integral sheet material which comprises:

(A) a base film of a plastic resin;

(B) an ink-receptive layer formed on at least one surface of the base film from a hydrophilic or water-soluble resin; and (C) an overcoating layer formed on the surface of the ink-receptive layer from a composition, as a uniform blend, comprising
  - (c1) a water-insoluble polyvinyl acetal resin,
  - (c2) particles of an organic resin, which is preferably an acrylic resin, having an average particle diameter in the range from 10 to 30 μm, and
  - (c3) a polyvinyl pyrrolidone resin, in such a weight proportion that the weight ratio of the amount of the component (c1) to the amount of the component (c2) is in the range from 40:1 to 10:1 and the amount of the component (c3) is in the range from 5 to 200% by weight relative to the total amount of the components (c1) and (c2).

It is preferable that the ink-receptive layer is formed from a mixture of a polyvinyl alcohol resin and a polyvinyl pyrrolidone resin in a weight proportion of 9:1 to 5:5.

DETAILED DESCRIPTION OF THE PREFERRED EMBODIMENTS

As is described above, the recording film of the invention has a three-layered structure consisting of (A) a base film, (B) an ink-receptive layer and (C) an overcoating layer in this order and the most characteristic feature of the invention consists in the unique and specific composition forming the overcoating layer.

The plastic resin material forming the base film as the layer (A) is not particularly limitative and can be selected from various kinds of plastic resins conventionally used in the prior art recording films including polyethylene, polypropylene, poly(ethylene terephthalate) and poly(vinyl chloride) resins, of which poly(ethylene terephthalate) resins are particularly preferable. The base film has a thickness in the range, usually, from 25 to 250 μm or, in most cases, from 50 to 150 μm, though dependent on the particularly intended application of the recording films.

While an ink-receptive layer as the layer (B) is formed on at least one surface of the above described base film as the layer (A), it is optional, in order to improve the adhesion of the ink-receptive layer to the base film, to interpose an undercoating layer between the base film and the ink-receptive layer. The undercoating layer is formed usually from a saturated polyester resin or urethane resin, of which urethane resins are preferred in respect of the high improving effect obtained thereby in the adhesion of the layers. The thickness of the undercoating layer is usually in the range from 0.5 to 1.5 $\mu$m.

The ink-receptive layer, which is formed directly or indirectly on the base film, is made from a hydrophilic or water-soluble resin which can be selected from various kinds of natural polymers such as polysaccharides, e.g., starch, cellulose, tannin, lignin, alginic acid and gum arabic, and gelatin as well as synthetic polymers such as polymers and copolymers comprising hydrophilic moiety derived from monomers such as vinyl acetate, ethylene oxide, acrylic acid, acrylamide, maleic anhydride and phthalic acid, polyester resins and polyamines, of which unmodified or modified poly(vinyl alcohol) resins, polyvinyl acetal resins and poly(vinyl pyrrolidone) resins are particularly preferred in respect of the excellent ink receptivity and color reproducibility. While these hydrophilic or water-soluble resins can be used either singly or as a combination of two kinds or more, it is preferable to use a mixture of a PVA resin and a PVP resin in a weight proportion in the range from 9:1 to 5:5 in respect of the ink receptivity and color reproducibility.

The PVA resin as a constituent of the ink-receptive layer has an average degree of polymerization of at least 1000 or, preferably, in the range from 1000 to 3000. When a PVA resin having a lower degree of polymerization than 1000 is used in the ink-receptive layer, the recording film would have disadvantageously low ink dryability and water resistance. While a PVA resin is a saponification product of a poly(vinyl acetate) resin, the degree of saponification in the PVA resin used in the present invention should be at least 75% or, preferably, in the range from 75 to 90%. When the degree of saponification of the PVA resin is too low, a decrease is caused in the velocity of ink absorption.

The PVP resin used in the ink-receptive layer has an average molecular weight of at least 40000 or, preferably, in the range from 60000 to 2800000. When the average molecular weight of the PVP resin is too low, a decrease is caused in the velocity of ink absorption and ink receptivity consequently with a decrease in the ink dryability.

Though optional, the ink-receptive layer in the inventive recording film can be imparted with improved water resistance when the resin or resin mixture forming the layer is crosslinked by using a suitable crosslinking agent together with a crosslinking catalyst depending on the kinds of the hydrophilic or water-soluble resins. When a PVA resin or a poly(vinyl acetal) resin is used in the ink-receptive layer, the crosslinking agent is preferably a urea resin or a cellulose-reactive crosslinking agent in an amount in the range from 4 to 12% by weight or, preferably, from 5 to 10% by weight relative to the amount of the PVA resin or poly(vinyl acetal) resin. When the amount of the crosslinking agent is too small, the desired improvement in the water resistance of the ink-receptive layer cannot be accomplished as a matter of course while, when the amount thereof is too large, a decrease is caused in the ink absorptivity of the ink-receptive layer. The amount of the crosslinking catalyst is usually in the range from 20 to 100% by weight based on the amount of the crosslinking agent.

It is further optional that the ink-receptive layer contains fine particles of an inorganic or organic powder in such an amount as not to unduly decrease the transparency of the layer with an object to obtain a roughened surface of the ink-receptive layer. Examples of the inorganic powders suitable for use in this regard include clay, kaolin and powders of zirconia, alumina, titanium dioxide, zeolite, calcium carbonate, barium sulfate, magnesium hydroxide, calcium phosphate, synthetic silica and glass, of which powders of synthetic silica and calcium carbonate are preferred in respect of the excellent ink absorptivity and absence of disordered ink dot profile. Examples of the organic powders include powders of a synthetic resin such as acrylic resins, urethane resins, poly(vinyl chloride) resins, benzoguanamine resins and condensation resins of benzoguanamine, melamine and formaldehyde. These inorganic and organic powders can be used either singly or as a combination of two kinds or more according to need.

In forming the ink-receptive layer on the surface of a base film, a uniform coating composition in a liquid form is prepared by dissolving or dispersing the above described essential and optional ingredients each in a specified proportion in an aqueous medium to give a solid content, usually, in the range from 10 to 15% by weight and the surface of the base film or the undercoating layer, if provided, is coated with the liquid coating composition by a suitable coating method known in the art followed by drying to form an ink-receptive layer having a thickness in the range from 5 to 30 $\mu$m or, preferably, from 10 to 20 $\mu$m, though dependent on the particularly intended application of the recording film.

It is of course optional that, besides the above mentioned essential and optional ingredients, the liquid coating composition is admixed with various kinds of known additives each in a limited amount including surface active agents, lubricants, stabilizers, coloring agents, ultra-violet absorbers and antioxidants.

In the recording film of the invention, the ink-receptive layer as the layer (B) formed on the base film as the layer (A) is overcoated with an overcoating layer as the layer (C) which is formed from a composition comprising the components (c1), (c2) and (c3) defined above. The component (c1) is a water-insoluble poly(vinyl acetal) resin which is an acetalization product of a PVA resin with an aldehyde compound. The degree of acetalization is in the range from 2 to 20% or, preferably, from 5 to 15% from the standpoint of obtaining a good balance between the ink dryability and the water resistance. The "water-insoluble poly(vinyl acetal) resin" here implied is a poly(vinyl acetal) resin which cannot be dissolved in a medium of water alone. When the degree of acetalization of the component (c1) is too low, the resin is not completely water-insoluble so that the water resistance of the overcoating layer is decreased while, when the degree of acetalization is too high, the water resistance of the layer can be further increased though at the sacrifice of the crosslinkability and ink dryability.

The component (c2) in the overcoating layer is a powder of an organic resin having an average particle diameter in the range from 10 to 30 $\mu$m. The particle configuration of the organic resin particles is not particularly limitative and can be spherical, globular or irregular. The organic resin of the powder is selected preferably from the group consisting of acrylic resins, urethane resins, poly(vinyl chloride) resins, benzoguanamine resins and condensation resins of benzoguanamine, melamine and formaldehyde, of which those having a refractive index of 1.45 to 1.60 are preferable in respect of the small difference of the refractive index from those of the component (c1) described above and the component (c3) described later. Acrylic resins are particularly preferable in this regard as the component (c2) although the above mentioned organic resins can be used either singly or as a combination of two kinds or more according to need.

The component (c3) in the overcoating layer is a PVP resin which serves to compensate the deficient ink absorptivity of the water-insoluble poly(vinyl acetal) resin as the component (c1) so as to improve the printability of the ink-receptive layer along with an effect of promotion of uniform dispersion of the organic resin particles as the component (c2) in the poly(vinyl acetal) resin contributing to the improvement of the coating workability with a coating composition containing the components (c1), (c2) and (c3) and improvement of the transparency of the overcoating layer by preventing the phenomenon of whitening of the layer.

The PVP resin as the component (c3) in the overcoating layer has an average molecular weight of at least 40000 or, preferably, in the range from 60000 to 2800000. When the ink-receptive layer is formed by using a PVP resin, it is advantageous that one and the same PVP resin is used in both of the ink-receptive layer and the overcoating layer because an advantage is obtained thereby that the velocity of ink transfer is further increased from the overcoating layer to the ink-receptive layer.

The overcoating layer as the layer (C) is formed by coating the surface of the ink-receptive layer as the layer (B) with a liquid coating composition containing the above described components (c1), (c2) and (c3) dissolved or dispersed in a liquid medium which is preferably a mixture of water and an alcoholic solvent such as ethyl alcohol and isopropyl alcohol or, preferably, isopropyl alcohol. When isopropyl alcohol is used as the alcoholic solvent, the weight ratio of water to isopropyl alcohol is in the range from 6:4 to 4:6.

In the formulation of a coating composition for the overcoating layer in the inventive recording film, the components (c1) and (c2) are compounded in such a weight proportion that the weight ratio of (c1) to (c2) is in the range from 40:1 to 10:1 or, preferably, from 25:1 to 14:1. When the weight proportion of the component (c2) is too small, a decrease is caused in the preventing effect against re-transfer of the printed pattern and blocking resistance of the recording films after printing. When the weight proportion of the component (c2) is too large, on the other hand, a decrease is caused in the reproducibility and sharpness of the printed images.

Further, the amount of the component (c3) in the overcoating layer is in the range from 5 to 200% by weight or, preferably, from 10 to 50% by weight based on the total amount of the components (c1) and (c2) in respect of the balance between ink absorptivity and tackiness of the surface. When the amount of the component (c3) is too small, a decrease is caused in the ink absorptivity of the ink-receptive layer while, when the amount of the component (c3) is too large, tackiness appears on the surface of the recording film after ink-jet printing.

In the preparation of the inventive ink-jet recording film, the surface of an ink-receptive layer formed on a base film is coated with a liquid coating composition for the overcoating layer, which is prepared by dissolving or dispersing the above described components (c1), (c2) and (c3) in a specified weight proportion in an overall concentration of the solid matter in the range from 2 to 5% by weight, by a known coating method followed by drying to form an overcoating layer. It is of course optional according to need that the overcoating liquid composition contains, besides the above mentioned essential ingredients, various kinds of known additives including surface active agents, lubricants, stabilizers, coloring agents, ultra-violet absorbers and antioxidants each in a limited amount. The thickness of the overcoating layer is in the range, usually, from 0.5 to 5 $\mu$m or, preferably, from 1 to 3 $\mu$m.

It is further optional that, when the inventive recording film has a single ink-receptive layer on only one of the surfaces of the base film, a curling-preventing layer is formed on the other surface of the base film opposite to the ink-receptive layer. The curling preventing layer is formed from a resin optionally in combination with a matting agent in the form of fine particles as dispersed in the resinous ingredient as the binder. The resinous ingredient can be a thermoplastic resin, thermosetting resin or photo-curable resin including acrylic resins, urethane resins, polyester resins and vinyl chloride-based resins. It is preferable that the resinous ingredient in the curling-preventing layer is the same resin as that used in the ink-receptive layer in respect of the good curling-preventing effect obtained thereby. The matting agent is selected from powders of an inorganic material such as silica, zirconia, clay, kaolin, alumina, titanium dioxide, zeolite, calcium carbonate, barium sulfate, magnesium hydroxide, calcium phosphate and glass and an organic resinous material including acrylic resins, urethane resins, polyvinyl chloride resins, benzoguanamine resins and condensation resins of benzoguanamine, melamine and formaldehyde. Particles of the matting agent should have an average particle diameter in the range from 0.1 to 20 $\mu$m or, preferably, from 2 to 10 $\mu$m.

The thickness of the curling-preventing layer is in the range from 5 to 20 $\mu$m and it is preferable that the curling-preventing layer has an about the same thickness as the ink-receptive layer. It is also optional that the curling-preventing layer further contains various kinds of known additives such as crosslinking agents, surface active agents, lubricants, stabilizers, coloring agents, ultra-violet absorbers and antioxidants.

As to the surface roughness of the inventive ink-jet recording film, it is preferable that the surface of the overcoating layer formed on the ink-receptive layer has a centerline average height in the range from 0.1 to 0.4 $\mu$m. When the surface is too smooth, the ink-jet recording film of the invention may suffer the disadvantageous phenomena of blocking and re-transfer of the printed images while, when the surface is overly roughened, a decrease is caused in the sharpness of the printed images and strengths of the coating layers.

In the following, the ink-jet recording film of the invention is illustrated in more detail by way of Examples and Comparative Examples, which, however, never limit the scope of the invention in any way. In the following Examples and Comparative Examples, the ink-jet recording films prepared there were evaluated for the following testing items by the respective testing procedures described there. In the following description, the term of “parts” always refers to “parts by weight”.

(1) Re-transfer of Printed Images

Printing of a computer-processed image pattern was made on a 2 cm by 2 cm wide area of the recording film under testing by utilizing the monochromic output in black, cyan, magenta or yellow and polychromic output in red, green and blue from a plotter machine (Model Design Jet 750C, manufactured by Hewlett Packard Co.) leaving a blank space. The thus printed recording film was, after standing for varied lengths of time to effect drying, folded double in such a fashion that the printed area was brought into contact with the blank area on the opposite flap of the folded film and the folded film was pressed under a load to find re-transfer of the printed images onto the blank area and recording was made of the minimum length of time of drying in three ratings of: A for a time shorter than 2 minutes; B for a time of 2 minutes or longer but shorter than 5 minutes; and C for a time of 5 minutes or longer.

(2) Ink Dryability

Printing on the recording film was performed by using the same plotter machine as used in (1) above and the printed surface was tested by finger touch to record the time taken for finger-touch drying in four ratings of: A for less than 10 seconds; B for 10 to 60 seconds; C for 60 seconds to 180 seconds; and D for 180 seconds or longer.

(3) Sharpness of Printed Images

Printing on the recording film was performed in the same manner as in (2) above and the sharpness of the printed image was visually inspected by panel members to record the results in three ratings according to the following criteria.

A: excellent sharpness without blur or ink repellency in each color

B: good sharpness though with slight blur or ink repellency

C: unacceptable sharpness with heavy blur and ink repellency

EXAMPLE 1

A liquid coating composition for the ink-receptive layer was prepared by dissolving, in 90 parts of water, 6 parts of a polyvinyl alcohol having an average degree of polymerization of 2000 and degree of saponification of 88.0% and 4 parts of a polyvinyl pyrrolidone having an average molecular weight of 1,280,000.

A base film of a polyethylene terephthalate resin having a thickness of 100 μm was coated on one surface provided with a 1.0 μm thick undercoating layer of a urethane resin with the above prepared liquid coating composition by using a wire bar coater followed by heating at 130° C. for 5 minutes to form a dried ink-receptive layer having a thickness of about 10 μm.

Separately, another liquid coating composition for the overcoating layer was prepared by dissolving or dispersing, in a mixture of 40 parts of isopropyl alcohol and 54.75 parts of water, 4 parts of a polyvinyl acetal resin having a degree of acetalization of 8%, 0.25 part of particles of an acrylic resin having an average particle diameter of 20 μm (MBX-20, a product by Sekisui Fine Chemical Co.) and 1 part of the same polyvinyl pyrrolidone resin as used above. The ink-receptive layer on the base film was coated with this second liquid coating composition followed by drying to form an overcoating layer having a thickness of 2 μm.

The other surface of the base film opposite to the ink-receptive layer was coated with a coating composition prepared by dissolving 20 parts of a copolymeric acrylic resin in 80 parts of water followed by drying at 130° C. for 2 minutes to form a curling-preventing layer having a thickness of 10 μm thus to complete an ink-jet recording film.

The results of the evaluation tests of this recording film were as follows.

Re-transfer of printed images: A

Ink dryability: A

Sharpness of printed images: A

EXAMPLE 2

The procedure for the preparation of an ink-jet recording film was substantially the same as in Example 1 excepting for the replacement of the liquid coating composition for the overcoating layer with another coating composition prepared by dissolving or dispersing, in a mixture of 40 parts of isopropyl alcohol and 54.85 parts of water, 2.5 parts of the same polyvinyl acetal resin, 0.15 part of the same acrylic resin particles and 2.5 parts of the same polyvinyl pyrrolidone resin.

The results of the evaluation tests of this recording film were as follows.

Re-transfer of printed images: A

Ink dryability: B

Sharpness of printed images: A

Comparative Example 1

The procedure for the preparation of an ink-jet recording film was substantially the same as in Example 1 excepting for the omission of the polyvinyl pyrrolidone resin and increase of the amount of water from 54.75 parts to 55.75 parts in the preparation of the liquid coating composition for the overcoating layer.

The results of the evaluation tests of this comparative recording film were as follows.

Re-transfer of printed images: A

Ink dryability: C

Sharpness of printed images: B

Comparative Example 2

The procedure for the preparation of an ink-jet recording film was substantially the same as in Example 1 excepting for the omission of the acrylic resin particles and increase of the amount of water from 54.75 parts to 55.0 parts in the preparation of the liquid coating composition for the overcoating layer.

The results of the evaluation tests of this comparative recording film were as follows.

Re-transfer of printed images: B

Ink dryability: C

Sharpness of printed images: A

Comparative Example 3

The procedure for the preparation of an ink-jet recording film was substantially the same as in Example 1 excepting for the omission of the polyvinyl acetal resin and increase of the amount of the polyvinyl pyrrolidone resin from 1 part to 5 parts in the preparation of the liquid coating composition for the overcoating layer.

The results of the evaluation tests of this comparative recording film were as follows.

Re-transfer of printed images: C

Ink dryability: C

Sharpness of printed images: A

What is claimed is:

1. A recording sheet for ink-jet printing which comprises:

(A) a base film of a plastic resin;

(B) an ink-receptive layer formed on at least one surface of the base film from a hydrophilic or water-soluble resin; and (C) an overcoating layer formed on the surface of the ink-receptive layer from a coating composition, as a uniform blend, comprising (c1) a water-insoluble polyvinyl acetal resin, (c2) particles of an organic resin having an average particle diameter in the range from 10 to 30 μm, and (c3) a polyvinyl pyrrolidone resin in such a weight proportion that the weight ratio of the amount of component (c1) to the amount of the component (c2) is in the range from 40:1 to 10:1 and the amount of the component (c3) is in the range from 5 to 200% by weight based on the total amount of the components (c1) and (c2).

2. The recording sheet for ink-jet printing as claimed in claim 1 in which the organic resin forming the particles as the component (c2) is an acrylic resin.

3. The recording sheet for ink-jet printing as claimed in claim 1 in which the hydrophilic or water-soluble resin forming the ink-receptive layer is a combination of a polyvinyl alcohol resin and a polyvinyl pyrrolidone resin in a weight proportion in the range from 9:1 to 5:5.

4. The recording sheet for ink-jet printing as claimed in claim 1 in which the plastic resin forming the base film is a polyethylene terephthalate resin.

5. The recording sheet for ink-jet printing as claimed in claim 1 in which the base film has a thickness in the range from 25 to 250 μm.

6. The recording sheet for ink-jet printing as claimed in claim 1 in which an undercoating layer of a resin having a thickness in the range from 0.5 to 1.5 μm is interposed between the surface of the base film and the ink-receptive layer.

7. The recording sheet for ink-jet printing as claimed in claim 6 in which the resin forming the undercoating layer is a urethane resin.

8. The recording sheet for ink-jet printing as claimed in claim 1 in which the ink-receptive layer has a thickness in the range from 5 to 30 μm.

9. The recording sheet for ink-jet printing as claimed in claim 1 in which the ink-receptive layer is formed on only one of the surfaces of the base-film and a curling-preventing layer of a resin is formed on the other surface of the base film opposite to the ink-receptive layer.

10. The recording sheet for ink-jet printing as claimed in claim 9 in which the curing-preventing layer has a thickness in the range from 5 to 20 μm.

11. The recording sheet for ink-jet printing as claimed in claim 1 in which the water-insoluble polyvinyl acetal resin as the component (c1) has a degree of acetalization in the range from 2% to 20%.

* * * * *